INVENTORS:
HERBERT D. COBURN
GILBERT H. KELLY

Jerry W. Mills
ATTORNEY

United States Patent Office 3,516,509
Patented June 23, 1970

3,516,509
SEISMIC WAVE GENERATOR HAVING ADJUSTABLE REACTION FORCE AND METHOD OF OPERATION THEREOF
Herbert D. Coburn, Dallas, and Gilbert H. Kelly, Irving, Tex., assignors to Texas Instruments Incorporated, Dallas, Tex., a corporation of Delaware
Filed May 2, 1968, Ser. No. 725,977
Int. Cl. G01v 1/02, 1/22, 1/38
U.S. Cl. 181—.5                        6 Claims

ABSTRACT OF THE DISCLOSURE

A gas exploder seismic wave generator includes a rigid reaction mass and a rigid bottom member slidably connected to form a chamber in which gas may be detonated. Rigid bail structure abuts with lower portions of the bottom member and extends around and over the reaction mass. Resilient bags filled with air under pressure are disposed between the rigid bail structure and the reaction mass in order to exert a reaction force against separation of the reaction mass and the bottom member when the gas is detonated. Structure is also provided to vary the air pressure within the resilient bags for the variance of the magnitude of the reaction force.

---

This invention relates to seismic generators, and more particularly to seismic generators utilizing the force generated by a gas explosion to generate seismic waves, and a novel method of operation thereof.

Various types of generators have been heretofore developed which generate seismic waves having desired energy levels and frequencies for penetration of geologic formations. In particular, good results have been obtained from gas exploder seismic wave generators which comprise a reaction mass telescoped within a rigid bottom pan to define a chamber in which gas is periodically exploded. On land operation of such wave generators the bottom pan is placed in direct contact with the earth and a heavy vehicle is set on the reaction mass to provide a sufficient static reaction force to restrict the axial separation of the reaction mass and the bottom pan during the gas explosions.

A disclosure of this type of gas exploder seismic wave generator is found in U.S. Pat. 3,373,840 to Kilmer, issued Mar. 19, 1968. Due to the necessity for the extremely heavy static reaction force, such previously developed wave generators have not been easily movable between operation sites, and also have not been easily adjustable to accommodate various operating conditions required for different ground hardnesses or varying fuel mixtures. Additionally, the large external static reaction mass required for operation of such gas exploder generators has made it impractical to use this type of generator underwater for marine seismic exploration.

Other types of seismic wave generators utilizing mechanical or hydraulic motors to generate seismic waves have also generally required extremely heavy reaction masses, such as the weight of a vehicle or the like, to hold the generators in contact with the earth. Examples of such generators are disclosed in U.S. Pats. 3,159,232 and 3,159,233, issued Dec. 1, 1964. The seismic wave generators disclosed in these patents utilize pneumatic pillow bags as shock absorbers for protection of the vehicles resting on the generators.

In accordance with the present invention, a seismic wave generator provides a simulated reaction force to restrain excessive vertical separation of the reaction mass and the rigid bottom member, without the necessity of a large externally applied reaction force. A rigid bail structure contacts the bottom member and extends around and over the reaction mass. Resilient members clamped between the bail structure and the reaction mass provide a self-contained reaction force to the generator.

In a more specific aspect of the invention, the resilient members comprise hollow elastomeric bodies filled with fluid under pressure, with structure being provided to vary the pressure of the fluid to selectively vary the reaction force against separation of the reaction mass and the bottom member.

For a more complete understanding of the present invention and further objects and advantages thereof, reference is now made to the following description taken in conjunction with the accompanying drawings, in which.

Figure 1:
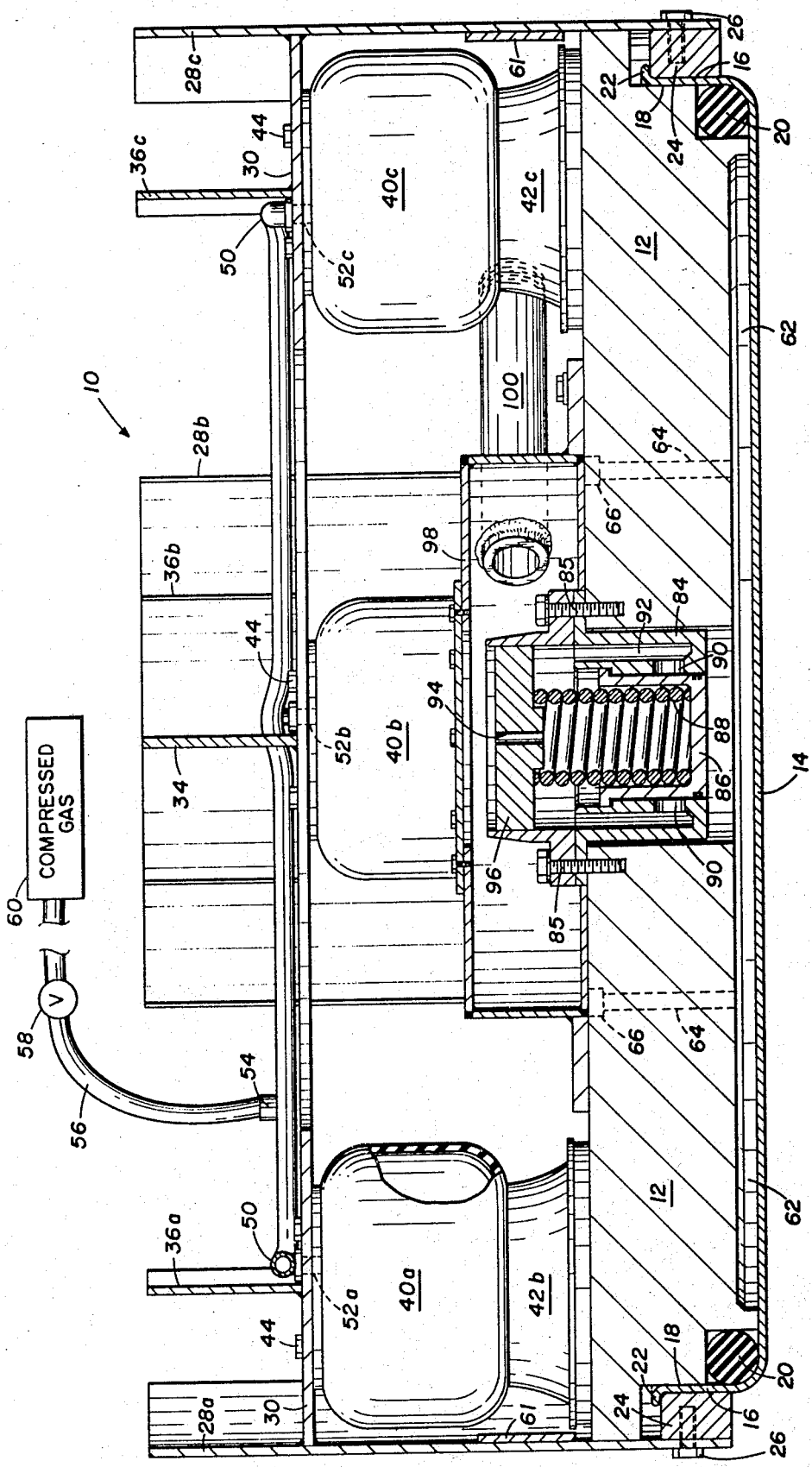
FIG. 1 illustrates a sectional view of the seismic wave generator.

Referring to FIG. 1, the present seismic generator is designated generally by the numeral 10 and comprises a heavy, rigid reaction mass 12 which fits in a telescoping relationship with a bottom pan member 14. Both the reaction mass 12 and the bottom pan 14 are generally circular, with the pan 14 having a circular upturned flange 16 which closely receives an annular shoulder 18 defined about the mass 12. A rubber O-ring 20 is disposed within an annular cut-out portion around the mass 12 to provide a seal against the escape of gas.

Figure 2:
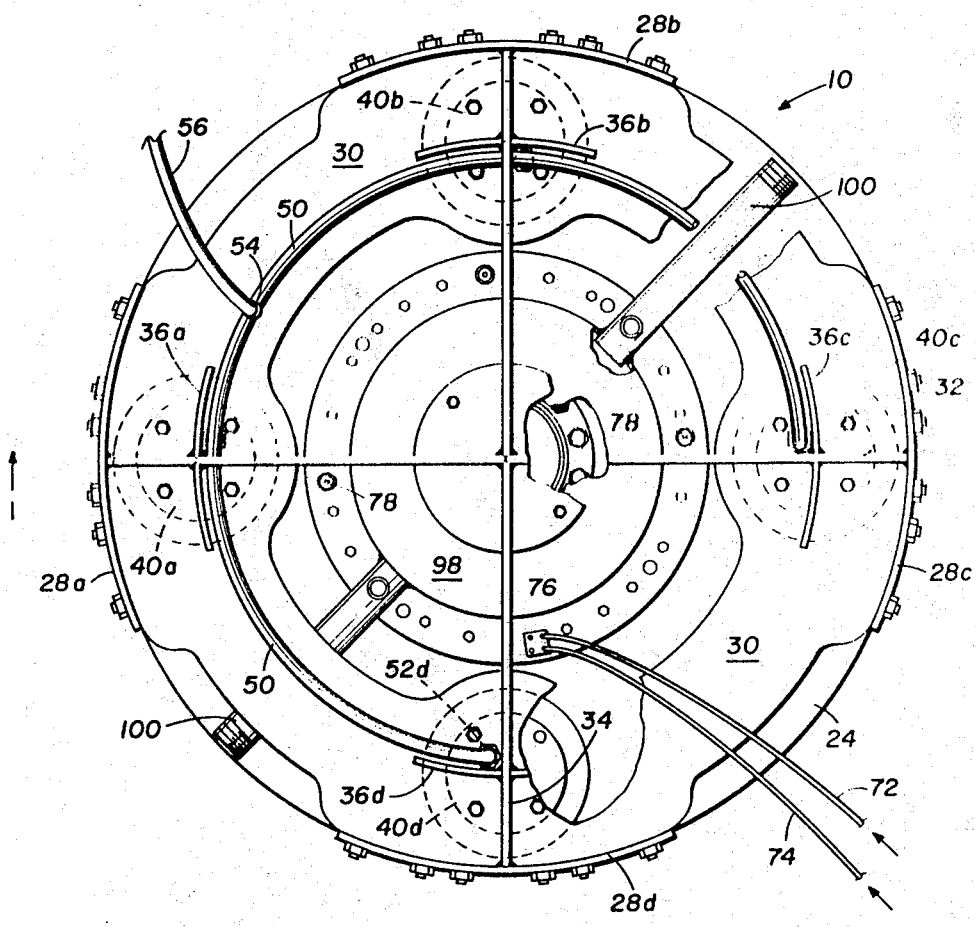
FIG. 2 is a top view, partially sectioned, of the generator shown in FIG. 1.
Figure 3:
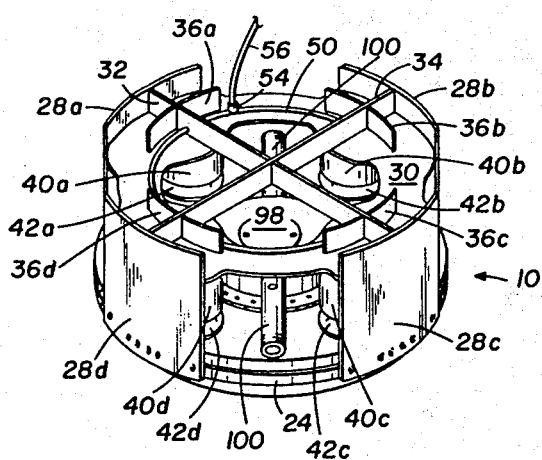
FIG. 3 is a perspective view of the generator shown in FIG. 1.

A radially outwardly extending lip 22 is defined about the bottom pan 14. A rigid metal ring 24 is disposed closely about the upturned flange 16 of the bottom pan 14 and abuts with the lip 22. Ring 24 is connected by bolts 26 to four curved side portions 28a–d of a bail structure which extends completely around and over the reaction mass 12. As best seen in FIGS. 2 and 3, the side portions 28a–d are joined, as by welding, at quadrants of an integral circular support member 30. Upstanding reinforcement members 32 and 34 cross over the top of the support member 30 to provide rigidity thereto. Additionally, four reinforcing members 36a–d are crossed with the members 32 and 34 to provide additional rigidity. The bail structure thus comprises a rigid connection of the ring 24, side portions 28, the support member 30 and the reinforcing members 32, 34 and 36.

Disposed between the bail structure and the reaction mass 12 are four resilient air-filled rubber bags 40a–d. These resilient bags may comprise any suitable hollow elastomeric body which may be filled with pressurized fluid under considerable pressure. In a preferred embodiment, the resilient bags comprise air bags manufactured and sold by the Firestone Tire & Rubber Company of Akron, Ohio. The air bags are mounted on pedestals 42a–d which are rigidly bolted to the upper surface of the reaction mass 12. The tops of the air bags 40a–d are secured to the support member 30 by bolts 44.

The bail structure acts as an extension of the bottom pan 14 and extends around and over the reaction mass 12. The air bags 40a–d provide a resilient force between the bail structure and the reaction mass 12 to provide a reaction force against axial separation of the reaction mass 12 and the bottom pan 14. Thus, a substantial additional static force, such as the weight of a vehicle, is not generally required with the use of the present invention. Due to this self-contained reaction force, the present seismic wave generator may be used on land, or suspended from a vessel and used underwater to generate underwater seismic waves.

A tube 50 communicates via pipe segments 52a–d with each of the air bags 40a–d. A T-connection 54 extends from the tube 50 to a rubber hose 56 which extends through a regulator valve 58 to a source of pressurized gas 60 (FIG. 1). Valve regulator 58 is of the bleed type, such that pressurized gas, such as air, may be either introduced or bled from the tube 50 and thence from the air bags 40a–d. By selective operation of the valve regulator 58, the pressure of the air within the hollow bags 40a–d may be selectively varied. Thus, when a very large reaction force is required upon the reaction mass 12 due to ground characteristics or the like, a very high air pressure may be introduced into the air bags 40a–d. However, when a lower reaction force is required against the reaction mass 12, a lower pressure may be introduced in to the air bags 40a–d. During operation of the wave generator 10, the pressure of the air introduced into the air bags 40a–d may be selectively varied in order to determine the optimum operating conditions of the generator.

Vertically oriented stop members 61 are connected on the side portions 28a–d to limit the vertical separation of the reaction 12 and the bottom pan 14. The lower portion of the reaction mass 12 is relieved to form the top of a gas chamber 62. The bottom of the chamber 62 is formed by the bottom pan member 14. Ports 64 (FIG. 1) are defined through the reaction mass 12 in order to introduce gas into the chamber 62 from an annular cavity 66 which connects the ports 64. As shown in FIG. 2, a suitable mixture of gas is introduced into the annular cavity 66 via hoses 72 and 74 feeding into a suitable mixing block 76. These gases may be a mixture of oxygen and propane, for instance. The mixed gas is fed through the ports 64 into the cavity 62, wherein the gas is selectively detonated by energization of spark plugs 78 (FIG. 2) in a conventional manner.

Referring again to FIG. 1, an annular bore is provided in the center of the reaction mass 12 for reception of a cylindrical exhaust member 84. Bolts 85 connect the exhaust member 84 to the reaction mass 12. A piston 86 is slidably mounted within the exhaust member 84 and is normally held in the illustrated position by a spring 88. However, upon explosion of gas within the chamber 62, force of the explosion pushes the piston 86 upwardly, thereby uncovering exhaust ports 90 in the walls of the exhaust member 84.

Exhaust gases from the explosion pass through the ports 90 and upwardly through annular passageways 92 within the exhaust member 84. The gases then exhaust through a bore 94 provided in the top 96 of the exhaust member 84. The exhausted gases pass into the interior of a manifold 98 which has a pair of outlet pipes 100 through which the gases pass to the atmosphere.

The present invention thus comprises a seismic wave generator wherein seismic shocks of substantial magnitude may be repetitiously generated without the requirement of substantial static reaction force applied to the generator from a vehicle or the like. The present device is easily moved from one position to another, and is suitable for use in marine seismic exploration. The magnitude of the reaction force applied to the reaction mass may be varied as required during the operation of the wave generator to provide optimal results for different environmental conditions, or for different gas mixtures. Further, the structure of the present generator maintains axial alignment of the various components even during strenuous operation.

What is claimed is:
1. A gas exploder seismic wave generator comprising:
    (a) a reaction mass,
    (b) a bottom pan telescoped with said reaction mass to form a chamber,
    (c) means for introducing an explosive mixture of gas into said chamber,
    (d) means for exploding the mixed gas within said chamber,
    (e) rigid frame structure abutting portions of said bottom pan and extending around and over said reaction mass,
    (f) a symmetrical array comprising a plurality of resilient bag means disposed between said frame structure and said reaction mass,
    (g) a source of pressurized fluid,
    (h) conduit means connecting said source of fluid with each of said bag means, and
    (i) valve means disposed in said conduit means and selectively operable to vary the pressure of fluid within bag means to optimize the applied reaction force as a restraint to limit the degree of axial movement of said reaction means and said bottom pan upon explosion of gas in said chamber.

2. The seismic wave generator of claim 1 wherein said resilient bag means comprises elastomeric bags filled with air under pressure.

3. The seismic wave generator of claim 1 characterized by said bag means comprising four elastomeric bags adapted to be filled with pressurized air, said bags being equally spaced relative to the periphery of said reaction mass.

4. The seismic wave generator of claim 1 wherein said frame structure comprises a rigid plate having downwardly depending side portions which abut peripheral portions of said bottom pan.

5. The seismic wave generator of claim 1 and further comprising rigid stop means for maintaining a predetermined degree of movement of said reaction mass relative to said bottom pan.

6. In an apparatus of the character described comprising a bottom pan telescoped with a reaction mass to form a chamber in which a gas explosion may occur, rigid frame structure abutting portions of the bottom pan and encompassing the reaction mass, resilient means disposed between the frame structure and the reaction mass, and means for establishing a predetermined resiliency of the resilient means, the method of operation comprising the steps of:
    repeatedly introducing and exploding gas in the chamber, and
    selectively varying the resiliency of the resilient means during operation of the apparatus.

References Cited

UNITED STATES PATENTS

| 3,260,327 | 7/1966 | McCollum | 181—.5 |
| 3,314,497 | 4/1967 | Kilmer | 181—.5 |
| 3,366,196 | 1/1968 | Kilmer | 181—.5 |
| 3,401,771 | 9/1968 | Kilmer | 181—.5 |
| 3,403,748 | 10/1968 | Tabor | 181—.5 |
| 3,405,780 | 10/1968 | Coburn et al. | 181—.5 |

BENJAMIN A. BORCHELT, Primary Examiner

T. H. WEBB, Assistant Examiner

U.S. Cl. X.R.

340—7